(12) United States Patent
Halbweiss et al.

(10) Patent No.: US 7,780,219 B2
(45) Date of Patent: Aug. 24, 2010

(54) ADJUSTABLE MOTOR VEHICLE ROOF

(75) Inventors: Thomas Halbweiss, Remseck (DE);
Wojciech Wezyk, Sindelfingen (DE);
Robert Koschien, Ostfildern (DE)

(73) Assignee: Magna Car Top Systems GmbH,
Bietigheim-Bissingen (DE)

( * ) Notice: Subject to any disclaimer, the term of this patent is extended or adjusted under 35 U.S.C. 154(b) by 317 days.

(21) Appl. No.: 12/042,644

(22) Filed: Mar. 5, 2008

(65) Prior Publication Data

US 2008/0150318 A1 Jun. 26, 2008

Related U.S. Application Data

(63) Continuation-in-part of application No. PCT/EP2006/007292, filed on Jul. 25, 2006.

(30) Foreign Application Priority Data

Sep. 9, 2005 (DE) ........................ 10 2005 047 192

(51) Int. Cl.
*B60J 7/08* (2006.01)
(52) U.S. Cl. .............. 296/108; 296/107.01; 296/107.09
(58) Field of Classification Search ............ 296/107.01, 296/107.09, 108, 116, 121, 122
See application file for complete search history.

(56) References Cited

U.S. PATENT DOCUMENTS 5,775,766 A   7/1998  Schaible et al.
5,975,620 A   11/1999 Jambor et al.
6,336,673 B1 * 1/2002 Rothe et al. ................. 296/108
6,557,921 B2  5/2003  Wezyk et al.
2005/0156449 A1 7/2005 Bruder et al.

FOREIGN PATENT DOCUMENTS

DE  102 49 640 A1  1/2004
FR  2 805 219 A1   8/2001

\* cited by examiner

*Primary Examiner*—Lori L Lyjak
(74) *Attorney, Agent, or Firm*—Brooks Kushman P.C.

(57) ABSTRACT

A vehicle roof assembly includes a roof having rear and front roof elements relative to the direction of forward vehicle travel. The roof elements are movable between closed and opened positions of the roof. The assembly further includes a roof kinematic system having first and second guide rod systems located on opposite sides of the roof for movably connecting the roof to a vehicle body to move the roof between its closed and opened positions. Each guide rod system includes a guide rod. The guide rods are articulately connectable at respective ends to the front roof element and the vehicle body. The two guide rods with their respective pairs of articulated joints form a common four-bar kinematic linkage. Alternatively, the first guide rod system may be a two-bar kinematic linkage and the second guide rod system may be a four-bar kinematic linkage.

20 Claims, 2 Drawing Sheets

ADJUSTABLE MOTOR VEHICLE ROOF

CROSS-REFERENCE TO RELATED APPLICATIONS

This is a continuation-in-part of International Application PCT/EP2006/007292, published in German, with an international filing date of Jul. 25, 2006, which claims priority to DE 10 2005 047 192.7, filed Sep. 9, 2005, the disclosures of which are both hereby incorporated by reference.

BACKGROUND OF THE INVENTION

1. Field of the Invention

The present invention relates to a vehicle roof assembly having a movable multi-element roof and a roof kinematic system for moving the roof between closed and opened positions.

2. Background Art

DE 195 16 877 C1 (corresponding to U.S. Pat. No. 5,775,766) describes a vehicle roof having roof elements articulately connected with one another. A roof kinematic system moves the roof between closed and opened positions. The roof kinematic system includes two guide rod systems in respective side regions of the roof. Each guide rod system is a symmetrical four-bar kinematic linkage. Although the roof kinematic system has a relatively simple design, it is desired to provide a roof kinematic system having relatively fewer components.

SUMMARY OF THE INVENTION

An object of the present invention includes a roof kinematic system for moving a movable multi-element roof between closed and opened positions in which the roof kinematic system includes relatively few components.

In carrying out the above objects and other objects, the present invention provides a vehicle roof assembly having a roof and a roof kinematic system. The roof includes rear and front roof elements relative to the direction of forward vehicle travel. The roof elements are movable between closed and opened positions of the roof. The roof kinematic system has first and second guide rod systems located on opposite sides of the roof for movably connecting the roof to a vehicle body to move the roof between its closed and opened positions. The first guide rod system includes a single first guide rod and the second guide rod system includes a single second guide rod. The guide rods each include an upper end and a lower end. The first guide rod is articulately connected at its upper end to the front roof element and is articulately connectable at its lower end to the vehicle body. The second guide rod is articulately connected to the front roof element and is articulately connectable at its lower end to the vehicle body. The second guide rod is situated farther to the front relative to the direction of forward vehicle travel than the first guide rod.

Further, in carrying out the above objects and other objects, the present invention provides a vehicle roof assembly having a roof and a roof kinematic system. The roof includes rear and front roof elements relative to the direction of forward vehicle travel. The rear roof element includes a window and first and second C-pillars connected to opposite sides of the window. The roof elements are movable between closed and opened positions of the roof. The roof kinematic system has first and second guide rod systems located on opposite sides of the roof for movably connecting the roof to a vehicle body to move the roof between its closed and opened positions. The first guide rod system includes a single first C-pillar guide rod, wherein the first C-pillar guide rod is connected to the first C-pillar and includes an upper end articulately connected to the front roof element and a lower end articulately connectable to the vehicle body. The second guide rod system includes a second C-pillar guide rod and a guide rod. The second C-pillar guide rod is connected to the second C-pillar and includes an upper end articulately connected to the front roof element and a lower end articulately connectable to the vehicle body. The guide rod includes an upper end articulately connected to the front roof element and a lower end articulately connectable to the vehicle body. The guide rod is situated farther to the front relative to the direction of forward vehicle travel than the C-pillar guide rods.

Also, in carrying out the above object and other objects, the present invention provides a roof kinematic system for movably connecting a roof having rear and front roof elements relative to the direction of forward vehicle travel to a vehicle body to move the roof between closed and opened positions. The system includes a first guide rod system having a single first guide rod, and a second guide rod system includes a single second guide rod. The guide rods each include an upper end and a lower end. The first guide rod is articulately connectable at its upper end to the front roof element and is articulately connectable at its lower end to the vehicle body. The second guide rod is articulately connectable to the front roof element and is articulately connectable at its lower end to the vehicle body. The second guide rod is situated farther to the front relative to the direction of forward vehicle travel than the first guide rod.

In accordance with an embodiment of the present invention, a vehicle roof assembly includes a roof having at least one rigid roof element which is displaceable between closed and opened positions by a roof kinematics system. The roof kinematic system includes a first handlebar arrangement in a first roof lateral area and a second handlebar arrangement in the opposite roof lateral area. The handlebar arrangements have different numbers of handlebars and/or articulated joints.

A vehicle roof assembly in accordance with an embodiment of the present includes: a roof having front and rear roof elements (relative to the direction of forward vehicle travel); and a roof kinematic system for moving the roof between closed and opened positions. The roof kinematic system includes two asymmetrical guide rod systems situated in respective side regions of the roof in which with kinematic system components, such as guide rods and/or articulated joints, are omitted from at least one of the guide rod systems. The original support and/or coupling function of the omitted kinematic system components is substituted in part by a correspondingly more stable design of the kinematic system components still present in the roof kinematic system. As such, the omission of the omitted kinematic system components does not impair the roof adjustment function. Compared to a symmetrical roof kinematic system, the omission of the omitted kinematic system components creates free space which may be used for other vehicle components. Such vehicle components need not be associated with the vehicle roof assembly.

Advantages of an asymmetrical roof kinematic system in accordance with an embodiment of the present invention include: the number of kinematic system components subjected to wear is reduced thereby minimizing maintenance; and the reduction of material and assembly costs as a result of certain kinematic system components being omitted.

The guide rod systems of an asymmetrical roof kinematic system in accordance with an embodiment of the present invention together form a multi-bar kinematic system having at least four articulated joints. In an embodiment, the guide rod systems form a common four-bar linkage for swiveling the roof between its closed and opened positions. For achieving the swivel function, it is sufficient for each guide rod system to respectively include a single guide rod. Each guide rod is articulately connected at its lower end to the vehicle body or a component mounted on the vehicle body. Compared to a symmetrical roof kinematic system having two symmetrical four-bar kinematic linkages, two guide rods and four articulated joints are omitted in the asymmetrical roof kinematic system. Another advantage of the asymmetrical roof kinematic system is that there is no risk of a shear effect from two crossing guide rods in either side roof region as only a single guide rod is present in each side roof region.

In an embodiment, the guide rod of a first one of the guide rod systems is a C-pillar guide rod. The C-pillar guide rod is part of the rear roof element or is fixedly connected to the rear roof element. By designing this guide rod as a C-pillar guide rod, the C-pillar guide rod may be integrated into the rear roof element so as to be hidden from view or may be formed by the rear roof element itself. At its upper end, the C-pillar guide rod is articulately connected to the front roof element. At its lower end, the C-pillar guide rod is articulately connected to the vehicle body. The guide rod of the second guide rod system is articulately connected at its upper end to the front roof element and is articulately connected at its lower end to the vehicle body.

The roof may include additional roof elements. For example, the roof may include an additional roof element situated in front of the front roof element, relative to the direction of forward vehicle travel. Such additional roof elements may be articulately connected to the front or rear roof element and/or to the vehicle body.

For stabilization of the articulation between the roof elements, in addition to the articulated connection of the rear roof element to the front roof element via the C-pillar guide rod of the first guide rod system, another articulated connection of the roof elements in the region of the second guide rod system may be provided. In this case, the two guide rod systems together form a five-bar kinematic linkage.

In an embodiment, the front and rear roof elements are articulately connected to one another solely via the C-pillar guide rod of the first guide rod system. Additional connecting joints between the roof elements are advantageously omitted. In this design, the total number of components is particularly few.

In an embodiment, the first guide rod system is a four-bar kinematic linkage and the second guide rod system is a two-bar kinematic linkage. To implement the four-bar kinematic linkage, the first guide rod system includes the C-pillar guide rod and an additional second guide rod. The C-pillar guide rod is articulately connected at its lower end to the vehicle body and is articulately connected at its upper end to the front roof element. The second guide rod is articulately connected at its lower end to the vehicle body and is articulately connected at its upper end to the front roof element. To implement the two-bar kinematic linkage, the second guide rod system includes a single guide rod which is designed as a C-pillar guide rod. The C-pillar guide rod is articulately connected at its lower end to the vehicle body and is articulately connected at its upper end to the front roof element.

In this embodiment, the rear roof element or the C-pillar guide rods of the rear roof element are articulately connected to the vehicle body and the front roof element. In this manner, leaks and vibrations are minimized. In this embodiment, an additional guide rod (i.e., the second guide rod) is provided with a C-pillar guide rod in only one side region of the roof. This additional guide rod supports the front roof element and with its neighboring C-pillar guide rod forms a four-bar kinematic linkage. The free space on the opposite side roof region which only has a single guide rod designed as a C-pillar guide rod may accommodate other vehicle components.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Figure 1:
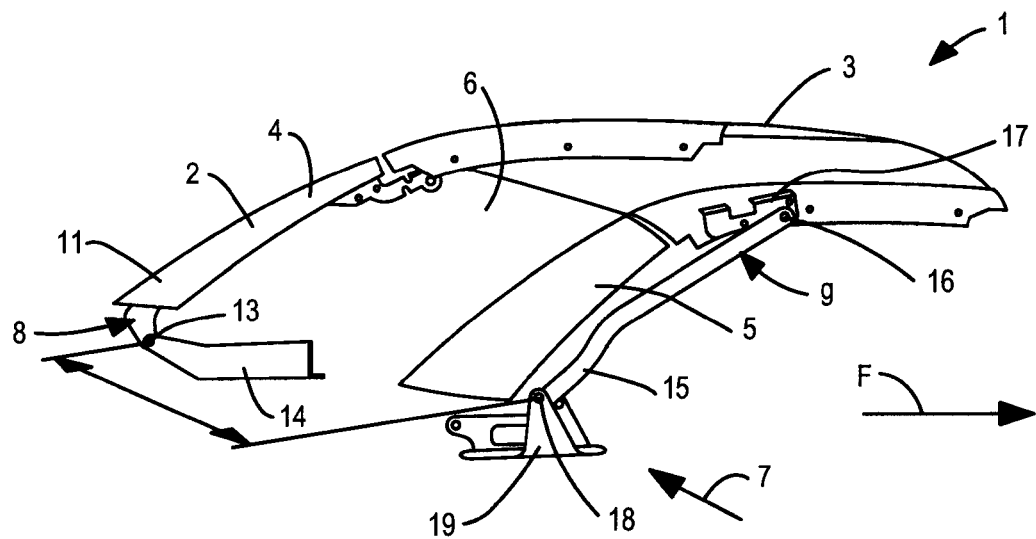
FIG. 1 illustrates a perspective view of a vehicle roof assembly having a multi-element movable roof and a roof kinematic system for moving the roof between closed and opened positions in accordance with an embodiment of the present invention with the roof being in its closed position.
Figure 2:
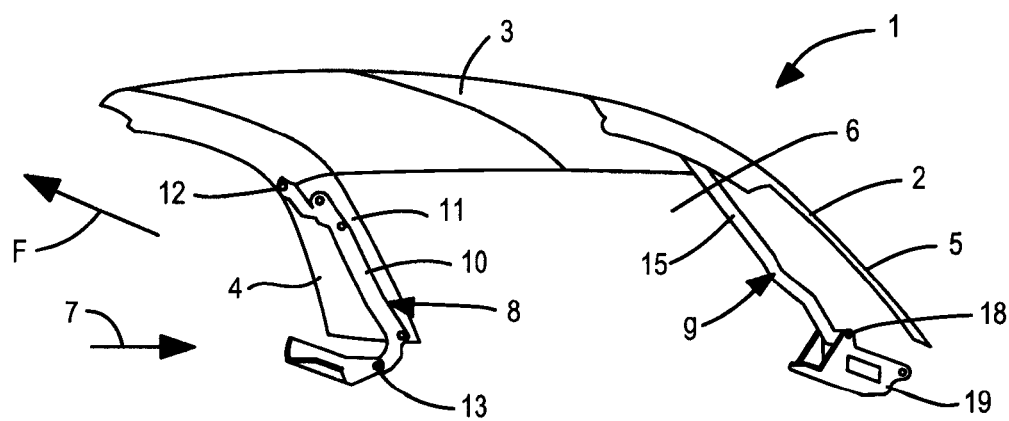
FIG. 2 illustrates a rotated perspective view of the vehicle roof assembly shown in FIG. 1.

Referring now to FIGS. 1 and 2, perspective views of a vehicle roof assembly in accordance an embodiment of the present invention are shown. The vehicle roof assembly includes a vehicle roof 1 and a roof kinematic system 7. Roof 1 is a multi-element movable roof having rigid roof elements 2, 3. Relative to the direction of forward travel F of the vehicle, roof element 2 is a rear roof element and roof element 3 is a front roof element. Rear roof element 2 includes a rear window 6 and two C-pillars 4, 5. C-pillars 4, 5 are rigidly connected to opposite sides of rear window 6.

In general, roof kinematic system 7 and roof elements 2, 3 are operable with one another such that roof kinematic system 7 is able to move roof elements 2, 3 between closed and opened positions of roof 1. In the closed position of roof 1, roof elements 2, 3 are extended to cover the vehicle interior. In the opened position of roof 1, roof elements 2, 3 are folded over one another such that the vehicle interior is exposed. FIGS. 1 and 2 illustrate roof 1 in its closed position.

As indicated, roof kinematic system 7 is operable to swivel roof 1 between its closed and opened positions. To this end, roof kinematic system 7 includes a first guide rod system 8 and a second guide rod system 9. First and second guide rod systems 8, 9 are located on opposite side regions of roof 1. As described in further detail below, roof kinematic system 7 is a four-bar kinematic linkage. That is, first and second guide rod systems 8, 9 together form a four-bar kinematic linkage.

First guide rod system 8 includes a single C-pillar guide rod 10. C-pillar guide rod 10 is hidden from view by a vehicle panel 11 of rear roof element 2. C-pillar guide rod 10 is fixedly connected to panel 11. The upper end of C-pillar guide rod 10 is articulately connected to the rear end region of front roof element 3 via an articulated joint 12. The lower end of C-pillar guide rod 10 is articulately connected to a bearing block 14 mounted on the vehicle body via an articulated joint 13. The articulated connection between C-pillar guide rod 10 and front roof element 3 via articulated joint 12 represents the sole articulated connection between rear and front roof elements 2, 3. That is, rear and front roof elements 2, 3 are articulately connected to one another to move between the closed and opened positions of roof 1 via the articulated connection between C-pillar guide rod 10 and front roof element 3 at articulated joint 12.

Second guide rod system 9 includes a single guide rod 15. Guide rod 15 is essentially straight. The upper end of guide rod 15 is connected via an articulated joint 16 to a support plate 17. Support plate 17 is welded to front roof element 3. The lower end of guide rod 15 is rotatably connected to a bearing block 19 mounted on the vehicle body via an articulated joint 18.

Guide rod 15 of second guide rod system 9 is situated farther to the front, relative to the direction of forward vehicle travel F, than C-pillar guide rod 10 of first guide rod system 8. Vehicle body-side articulated joint 18 and front roof element-side articulated joint 16 of second guide rod 15 are both situated farther to the front, relative to the direction of forward vehicle travel F, than the corresponding articulated joints 13, 12 of C-pillar guide rod 10.

C-pillar guide rod 10 with its two articulated joints 12, 13 of first guide rod system 8 together with guide rod 15 with its two articulated joints 16, 18 of second guide rod system 9 form a common four-bar kinematic linkage for the entire roof side regions. In this embodiment, additional guide rods may be omitted.

Figure 3:
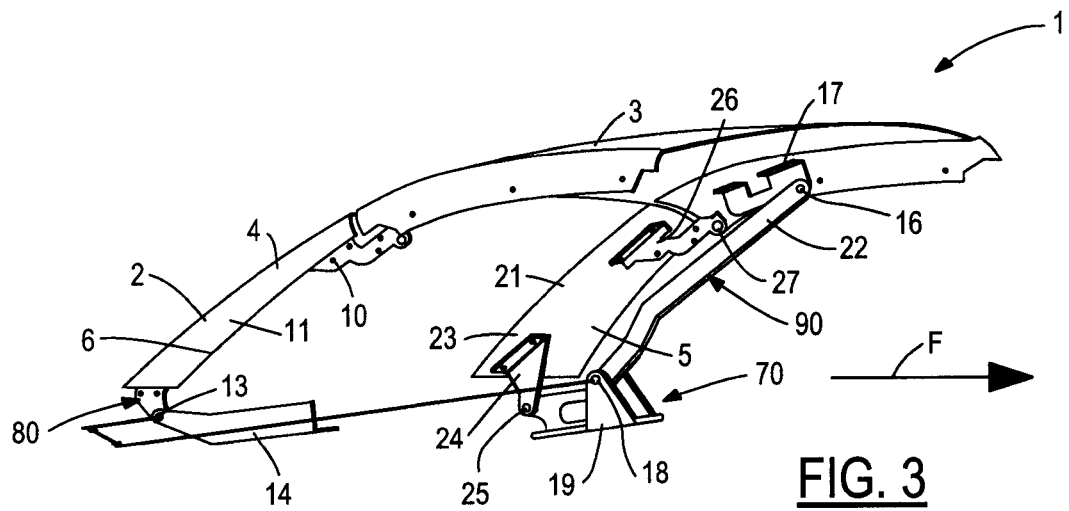
FIG. 3 illustrates a perspective view of a vehicle roof assembly having a multi-element movable roof and a roof kinematic system for moving the roof between closed and opened positions in accordance with another embodiment of the present invention with the roof being in its closed position.
Figure 4:
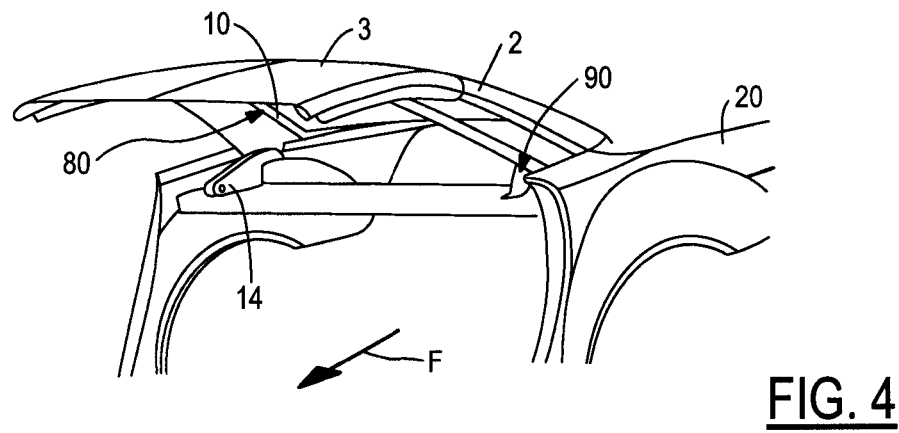
FIG. 4 illustrates a rotated perspective view of the vehicle roof assembly shown in FIG. 3 and a vehicle.
Figure 5:
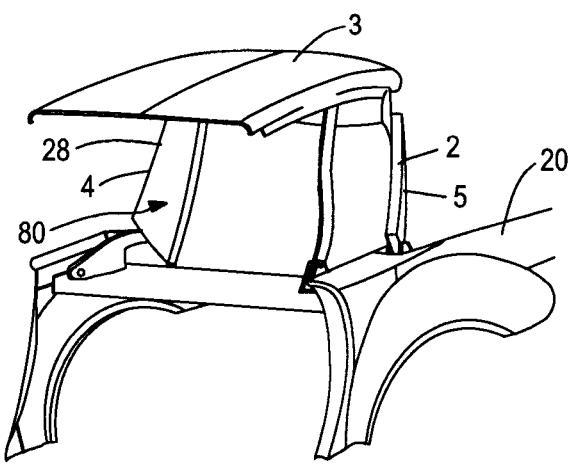
FIG. 5 illustrates a perspective view of the vehicle roof assembly shown in FIG. 3 and the vehicle with the roof being in an intermediate position between its closed and opened positions.

Referring now to FIGS. 3, 4, and 5, perspective views of a vehicle roof assembly in accordance with another embodiment of the present invention are shown. The vehicle roof assembly includes roof 1 and a roof kinematic system 70. As described above, roof 1 is a multi-element movable roof having rear and front roof elements 2, 3 in which rear roof element 2 includes rear window 6 and two C-pillars 4, 5 which are rigidly connected to opposite sides of rear window 6.

In general, roof kinematic system 70 and roof elements 2, 3 are operable with one another such that roof kinematic system 70 is able to move roof elements 2, 3 between the closed and opened positions of roof 1. FIGS. 3 and 4 illustrate roof 1 in its closed position. FIG. 5 illustrates roof 1 in an intermediate position between its closed and opened positions. In FIGS. 4 and 5, a vehicle 20 associated with the vehicle roof assembly is shown.

As indicated, roof kinematic system 70 is operable to swivel roof 1 between its closed and opened positions via the intermediate position. To this end, roof kinematic system 70 includes a first guide rod system 80 and a second guide rod system 90. First and second guide rod systems 80, 90 are located on opposite side regions of roof 1. As described in further detail below, roof kinematic system 70 includes a two-bar kinematic linkage and a four-bar kinematic linkage. That is, first and second guide rod systems 80, 90 together form a two-bar kinematic linkage and a four-bar kinematic linkage.

First guide rod system 80 includes a single C-pillar guide rod 10. C-pillar guide rod 10 is hidden from view by vehicle panel 11 of rear roof element 2. C-pillar guide rod 10 is fixedly connected to panel 11. The upper end of C-pillar guide rod 10 is articulately connected to the rear end region of front roof element 3. The lower end of C-pillar guide rod 10 is articulately connected to bearing block 14 mounted on the vehicle body via articulated joint 13. C-pillar guide rod 10 with its two articulated joints forms a two-bar kinematic linkage. Additional guide rods may be omitted in first guide rod system 80.

Second guide rod system 90 is designed as a four-bar kinematic linkage. To this end, second guide rod system 90 includes a three-part C-pillar guide rod 21 and a guide rod 22. Guide rod 22 is essentially straight and parallel to C-pillar guide rod 21. Guide rod 22 is situated farther to the front of C-pillar guide rod 21 with respect to the forward direction of vehicle travel F. A vehicle panel part 23 of rear roof element 2 functions as C-pillar guide rod 21. The lower end of panel part 23 includes a lower support panel 24. The lower end of panel part 23 is retained on bearing block 19 mounted on the vehicle body via lower support panel 24 so as to be rotatable about an articulated joint 25. The upper end of panel part 23 includes an upper support panel 26. The upper end of panel part 23 is articulately connected via upper support panel 26 to front roof element 3 via an articulated joint 27. The upper end of guide rod 22 is articulately connected to support plate 17 of front roof element 3 via articulated joint 16. The lower end of guide rod 22 is articulately connected to bearing block 19 mounted on the vehicle body via an articulated joint 18.

A difference between the first vehicle roof assembly embodiment shown in FIGS. 1 and 2 with the second vehicle roof assembly embodiment shown in FIGS. 3, 4, and 5 is that the second vehicle roof assembly embodiment includes three-part C-pillar guide rod 21. Three-part C-pillar guide rod 21 has a weaker design than C-pillar guide rod 10 as the support function for rear roof element 2 is largely taken over by first guide rod system 80. The majority of three-part C-pillar guide rod 21 is formed by panel part 23. Support panels 24 and 26 are in the regions of the articulated connections of panel part 23 for reinforcement of panel part 23.

As indicated above, FIG. 5 illustrates an intermediate position of roof 1 during its swivel motion between its closed and opened positions. The space saved by omission of an additional guide rod for first guide rod system 80 is seen.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle roof assembly comprising:
   a roof having rear and front roof elements relative to the direction of forward vehicle travel, wherein the roof elements are movable between closed and opened positions of the roof; and
   a roof kinematic system having first and second guide rod systems located on opposite sides of the roof for movably connecting the roof to a vehicle body to move the roof between its closed and opened positions;
   wherein the first guide rod system includes a single first guide rod and the second guide rod system includes a single second guide rod, wherein the first and second guide rods each include an upper end and a lower end, wherein the first guide rod is articulately connected at its upper end to the front roof element and is articulately connectable at its lower end to the vehicle body, wherein the second guide rod is articulately connected to the front roof element and is articulately connectable at its lower end to the vehicle body, wherein the second guide rod is situated farther to the front relative to the direction of forward vehicle travel than the first guide rod.

2. The assembly of claim 1 wherein:
the rear roof element includes a window and two C-pillars connected to opposite sides of the window.

3. The assembly of claim 2 wherein:
the first guide rod is a C-pillar guide rod.

4. The assembly of claim 3 wherein:
the C-pillar guide rod is connected to one of the C-pillars.

5. The assembly of claim 4 wherein:
the first guide rod is articulately connected at its upper end to the front roof element via a first front roof element articulated joint and is articulately connectable at its lower end to the vehicle body via a first vehicle body articulated joint, wherein the second guide rod is articulately connected to the front roof element via a second front roof element articulated joint and is articulately connectable at its lower end to the vehicle body via a second vehicle body articulated joint.

6. The assembly of claim 5 wherein:
the second front roof element articulated joint and the second vehicle body articulated joint are situated farther to the front relative to the direction of forward vehicle travel than the first front roof element articulated joint and the first vehicle body articulated joint.

7. The assembly of claim 6 wherein:
the C-pillar guide rod with its two articulated joints of the first guide rod system together with the second guide rod with its two articulated joints of the second guide rod system form a common four-bar kinematic linkage.

8. A vehicle roof assembly comprising:
a roof having rear and front roof elements relative to the direction of forward vehicle travel, wherein the rear roof element includes a window and first and second C-pillars connected to opposite sides of the window, wherein the roof elements are movable between closed and opened positions of the roof; and
a roof kinematic system having first and second guide rod systems located on opposite sides of the roof for movably connecting the roof to a vehicle body to move the roof between its closed and opened positions;
wherein the first guide rod system includes a single first C-pillar guide rod, wherein the first C-pillar guide rod is connected to the first C-pillar and includes an upper end articulately connected to the front roof element and a lower end articulately connectable to the vehicle body;
wherein the second guide rod system includes a second C-pillar guide rod and a guide rod, wherein the second C-pillar guide rod is connected to the second C-pillar and includes an upper end articulately connected to the front roof element and a lower end articulately connectable to the vehicle body, wherein the guide rod includes an upper end articulately connected to the front roof element and a lower end articulately connectable to the vehicle body;
wherein the guide rod is situated farther to the front relative to the direction of forward vehicle travel than the C-pillar guide rods.

9. The assembly of claim 8 wherein:
the first C-pillar guide rod is a single part C-pillar guide rod and the second C-pillar guide rod is a three-part C-pillar guide rod.

10. The assembly of claim 9 wherein:
the three-part C-pillar guide rod includes a main panel part, a lower panel part, and an upper panel part connected to one another, wherein the upper panel part is articulately connected to the front roof element and the lower panel part is articulately connectable to the vehicle body.

11. The assembly of claim 8 wherein:
the first guide rod system forms a two-bar kinematic linkage and the second guide rod system forms a four-bar kinematic linkage.

12. The assembly of claim 8 wherein:
the first C-pillar guide rod is articulately connected at its upper end to the front roof element via a first front roof element articulated joint and is articulately connectable at its lower end to the vehicle body via a first vehicle body articulated joint, wherein the second C-pillar guide rod is articulately connected at its upper end to the front roof element via a second front roof element articulated joint and is articulately connectable at its lower end to the vehicle body via a second vehicle body articulated joint, wherein the guide rod is articulately connected to the front roof element via a third front roof element articulated joint and is articulately connectable at its lower end to the vehicle body via a third vehicle body articulated joint.

13. The assembly of claim 12 wherein:
the third front roof element articulated joint and the third vehicle body articulated joint are situated farther to the front relative to the direction of forward vehicle travel than the first and second front roof element articulated joints and the first and second vehicle body articulated joints.

14. A roof kinematic system for movably connecting a roof having rear and front roof elements relative to the direction of forward vehicle travel to a vehicle body to move the roof between closed and opened positions, the system comprising:
a first guide rod system having a single first guide rod; and
a second guide rod system includes a single second guide rod;
wherein the first and second guide rods each include an upper end and a lower end, wherein the first guide rod is articulately connectable at its upper end to the front roof element and is articulately connectable at its lower end to the vehicle body, wherein the second guide rod is articulately connectable to the front roof element and is articulately connectable at its lower end to the vehicle body, wherein the second guide rod is situated farther to the front relative to the direction of forward vehicle travel than the first guide rod.

15. The system of claim 14 wherein:
the first guide rod is a C-pillar guide rod.

16. The system of claim 15 wherein:
the C-pillar guide rod is connectable to a C-pillar of the rear roof element.

17. The system of claim 15 wherein:
the first guide rod is articulately connectable at its upper end to the front roof element via a first front roof element articulated joint and is articulately connectable at its lower end to the vehicle body via a first vehicle body articulated joint, wherein the second guide rod is articulately connectable to the front roof element via a second front roof element articulated joint and is articulately connectable at its lower end to the vehicle body via a second vehicle body articulated joint.

18. The system of claim 17 wherein:
the second front roof element articulated joint and the second vehicle body articulated joint are situated farther to the front relative to the direction of forward vehicle travel than the first front roof element articulated joint and the first vehicle body articulated joint.

19. The system claim 18 wherein:
the C-pillar guide rod with its two articulated joints of the first guide rod system together with the second guide rod with its two articulated joints of the second guide rod system form a common four-bar kinematic linkage.

20. The system of claim 15 wherein:

the second guide rod system further includes a C-pillar guide rod, wherein the C-pillar guide rod of the second guide rod system includes an upper end and a lower end, wherein the C-pillar guide rod of the second guide rod system is articulately connectable at its upper end to the front roof element and is articulately connectable at its lower end to the vehicle body.

* * * * *